United States Patent [19]  [11] 4,125,130
Yamamoto  [45] Nov. 14, 1978

[54] BELLOWS PERMITTING TWISTING MOVEMENT

[75] Inventor: Ken Yamamoto, Tokyo, Japan

[73] Assignee: Doryokuro Kakunenryo Kaihatsu Jigyodan, Tokyo, Japan

[21] Appl. No.: 747,247

[22] Filed: Dec. 2, 1976

[30] Foreign Application Priority Data

Dec. 11, 1975 [JP] Japan .................................. 50-14779

[51] Int. Cl.² ............................................. F16L 11/00
[52] U.S. Cl. .................................... 138/121; 138/177
[58] Field of Search ............... 138/173, 121, 122, 177, 138/DIG. 11, 118.1, 178

[56] References Cited
U.S. PATENT DOCUMENTS 525,061 8/1824 Schmidt et al. ....................... 138/173
2,752,172 6/1956 Ziebold ................................ 138/121

FOREIGN PATENT DOCUMENTS 1,186,324 4/1970 United Kingdom ...................... 138/122

Primary Examiner—Richard E. Aegerter
Assistant Examiner—Willis Little

[57] ABSTRACT

A bellows which is made up of a plurality of coaxially joined bellows elements each having a plurality of n parallelogram-shaped wall elements of thin plate material joined together and positioned around a common center axis. The upper and lower edges of the thus joined wall elements define spaced parallel congruent planar orthopolygonal shapes each having n sides, n being equal to or greater than 3. Each of the orthopolygonal shapes is angularly offset in a direction around the central axis from the next adjacent orthopolygonal shape. The wall elements each have a fold line between the diagonally opposite vertexes which are the farthest apart. The bellows can have a further bellows with an axial cross-sectional shape in the form of waves joined coaxially thereto.

2 Claims, 5 Drawing Figures

BELLOWS PERMITTING TWISTING MOVEMENT

BACKGROUND OF THE INVENTION

The present invention relates to an improvement of a bellows which permits twisting movement while the interior remains hermetically sealed.

Bellows are, in general, constructed by stacking a multiplicity of conical elements made of a thin plate material in a manner such that the cross section through the center axis is in the form of waves. Therefore, although folding action is provided to a considerable degree i.e., the expansion and contraction in the axial direction, the bellows are very weak with respect to twisting or torsional force.

However, bellows used for mechanical seals and bellows used to cope with the thermal expansion of high-temperature conduits are often subject to a torsional or twisting force. Therefore, there is an increasing demand to provide bellows suited for such applications and that do not rupture even under the conditions of torsional or twisting force.

SUMMARY OF THE INVENTION

An object of the present invention, therefore, is to provide a bellows that can undergo movements of expansion and contraction in the axial direction as well as twisting.

To accomplish the abovesaid object, the bellows of the present invention comprises a plurality of stacked elements the ends of which are congruent orthopolygonal planes ($n$ is a positive integer equal to, or larger than, 3) having a common center axis, which are arrayed in parallel and offset around the axis at angles to each other to thereby establish a false orthopolygonal column, and the peripheral surfaces of the thus established column are formed of a thin plate material, wherein the longer of the distances across diagonal vertexes of a parallelogram formed by linking corresponding vertexes of the adjacent orthopolygonal planes is a fold line.

The bellows of the present invention can be used alone, or in cascade connection with conventional bellows. In the latter case, the expansion and contraction in the axial direction are carried out by the conventional bellows; the bellows of the false ortho $n$-gonal column accommodate the twisting force.

BRIEF DESCRIPTION OF THE DRAWINGS

Other objects and advantages of the present invention will be seen from the following description when viewed in conjunction with the accompanying drawings wherein.

DETAILED DESCRIPTION OF THE INVENTION

The present invention is illustrated below in detail with reference to a preferred embodiment.

Figure 1A:
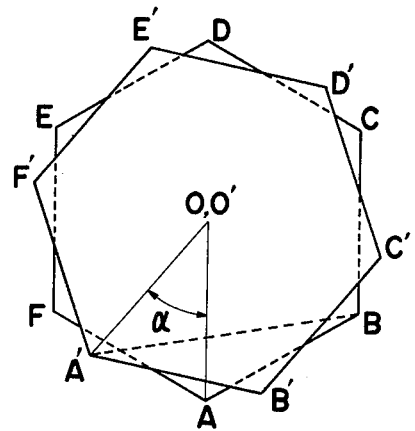
FIGS. 1($a$), ($b$) and ($c$) are a plan view, a side view, and a perspective view respectively, illustrating a bellows element of an embodiment of the present invention.
Figure 1B:
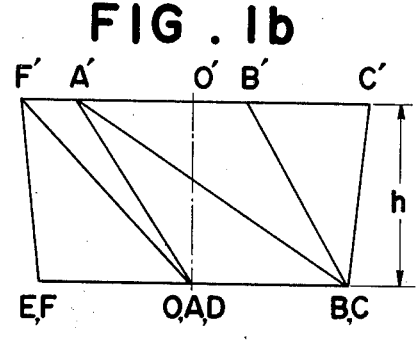
Figure 1C:
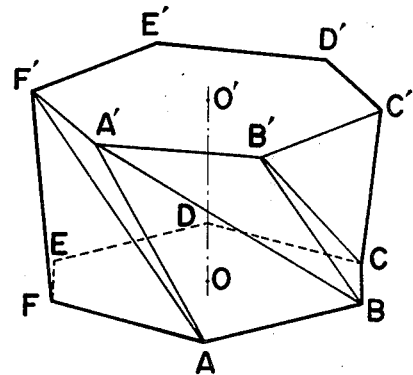

Referring to FIGS. 1($a$), ($b$) and ($c$), the bellows element has a plurality of $n$ parallelogram-shaped wall elements joined together and positioned around a common center axis O, O', the upper and lower edges defining parallel congruent planar orthopolygonal shapes having $n$ sides, in this case ortho hexagonal planes ABCDEF and A'B'C'D'E'F' in parallel planes with a distance $h$ between the planes. The orthopolygonal shapes are offset by an angle $\alpha$ in the direction parallel to the planes ($<$AOA' in FIG. 1($a$)). The lines between corresponding vertexes A, A' and B, B' form the edges of adjacent parallelogram shaped wall elements A'ABB'. The longer one of the distances between diagonally opposite vertexes of each parallelogram-shaped wall element (A'B in the case shown) is a diagonal folding line. Thus the two ortho hexagonal planes ABCDEF and A'B'C'D'E'F' are linked by a plurality of wall elements formed by the two triangular surfaces A'B'B and A'AB including a diagonal folding line A'B and made of a thin plate material that permits a small deformation, and if the lines AB, A'B and A'B' are fold lines, then a change of distance $h$ between the planes results in a change of the angle $\alpha$, the center axis O, O' always remaining in the same position. In this way, the change in distance $h$ between the planes can be converted to a change in the angle $\alpha$.

Figure 2:
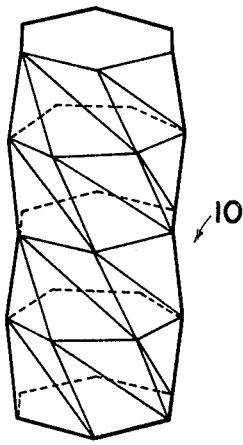
FIG. 2 is a perspective view of the bellows composed of the bellows elements of FIG. 1.

By linking any number of the thus formed bellows elements in the axial direction, a false ortho hexagonal column 10 can be obtained as shown in FIG. 2. The false ortho hexagonal column serves as a member to convert expansion and contraction in the axial direction into a twisting movement between the ends.

In the foregoing, an ortho hexagonal column has been described as an example of an orthopolygonal column. The present invention, however, can have $n \leqq 3$, if the relation between $h$ and $\alpha$ is selected appropriately.

The bellows according to the present invention constructed as described above permits a twisting movement that is not possible with the conventional bellows. Therefore, the use of the bellows of the present invention to cope with the thermal expansion of high-temperature conduits, obviates the need for particular support construction that has heretofore been employed to prevent application of a twisting force to the bellows.

Figure 3:
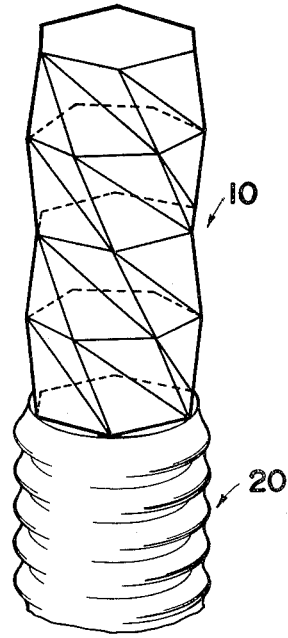
FIG. 3 is a perspective view showing an embodiment in which a bellows according to the present invention and a conventional bellows are connected in cascade.

The bellows 10 of the present invention may be connected in cascade to a conventional bellows 20, the cross section of which along the common axis O, O' is in the form of waves, as shown in FIG. 3. With such a construction, the expansion and contraction in the axial direction can be accommodated by the conventional bellows, and the twisting motion between the end surfaces can be accommodated by the false orthopolygonal column bellows.

While the invention has been described in a detailed description of a preferred embodiment, it is understood that various modifications can be made within the scope of the appended claims.

What is claimed is:

1. A bellows comprising a plurality of coaxially joined bellows elements each made up of a plurality of $n$ parallelogram-shaped wall elements of thin plate material joined together and positioned around a common center axis, the upper and lower edges of the thus joined wall elements defining spaced parallel congruent planar orthopolygonal shapes each having sides, $n \geqq 3$, each of the orthopolygonal shapes being angularly offset in a direction around the central axis from the next adjacent orthopolygonal shapes, said wall elements each having a fold line between the diagonally opposite vertexes which are farthest apart.

2. A bellows as claimed in claim 1 further comprising a further bellows which has an axial cross-sectional shape in the form of waves, said further bellows being joined coaxially to one end of said firstmentioned bellows.

* * * * *